(12) United States Patent
Arrigoni et al.

(10) Patent No.: US 12,450,435 B2
(45) Date of Patent: Oct. 21, 2025

(54) APPARATUS AND METHOD FOR PERFORMING FORENSIC ACTIVITY THROUGH AUTOMATIC LOG ANALYSIS

(71) Applicant: LogicMonitor, Inc., Santa Barbara, CA (US)

(72) Inventors: Nicholas Arrigoni, Marietta, GA (US); Kristopher Sneed, Providence, RI (US); Elaine Tsun, Manchester, CT (US); Ran Gilboa, Cambridge, MA (US)

(73) Assignee: LOGICMONITOR, INC., Santa Barbara, CA (US)

( * ) Notice: Subject to any disclaimer, the term of this patent is extended or adjusted under 35 U.S.C. 154(b) by 337 days.

(21) Appl. No.: 18/154,640

(22) Filed: Jan. 13, 2023

(65) Prior Publication Data

US 2024/0242031 A1    Jul. 18, 2024

(51) Int. Cl.
*G06F 40/289*     (2020.01)
*G06F 40/205*     (2020.01)

(52) U.S. Cl.
CPC .......... *G06F 40/289* (2020.01); *G06F 40/205* (2020.01)

(58) Field of Classification Search
CPC .............................. G06F 40/289; G06F 40/205

USPC ............................................................. 704/9
See application file for complete search history.

(56) References Cited

U.S. PATENT DOCUMENTS

| | | | |
|---|---|---|---|
| 9,020,956 B1* | 4/2015 | Barr ...................... | G06F 16/951 |
| | | | 707/750 |
| 10,817,604 B1* | 10/2020 | Kimball ................ | G06F 21/563 |
| 2015/0066814 A1* | 3/2015 | Allen ..................... | G06F 40/30 |
| | | | 706/11 |
| 2017/0270099 A1* | 9/2017 | Gorny ..................... | G06F 17/18 |
| 2021/0258321 A1* | 8/2021 | Vegulla .................... | G06N 5/04 |
| 2024/0242031 A1* | 7/2024 | Arrigoni ............... | G06F 40/289 |

* cited by examiner

*Primary Examiner* — Edwin S Leland, III
(74) *Attorney, Agent, or Firm* — ArentFox Schiff LLP

(57) ABSTRACT

A method is provided for performing forensic log analysis using automatic log analysis when troubleshooting data logs. Specifically, the method includes obtaining log files from an operation system, an application, a server, or a device. The method also includes parsing data from the log files to generate categories including at least exceptions, keywords, severity levels, resources, or classes, where each type of category has a respective category weight value. The method also includes identifying phrases based at least in part on the categories. The method further includes generating a sentiment score for a log line from the log files based at least in part on the categories, category weight values, or the phases.

19 Claims, 15 Drawing Sheets

[2022-09-01 10:61:47.160 PDT] [MSG] [INFO] [CO-1:seedip:criticaloperationdb:reqId=1670916971:uri=cotask:report raw eris:192.168.36.60,propertyRuleId:70] [ReportRawEriCriticalOperation._run:69] script property exec error; CONTEXT=hostName=192.168.36.60,propertyRuleId=70, errorMsg=failed during script running sseId:0 ArrayIndexOutOfBoundsException Index 1 out of bounds for length 1

901
_resource.name="dkr03.1a3" AND "status=bounced" AND ("Host or domain name not found" OR "The email account that you tried to reach does not exist") | parse /to<(\S+),/ as email |count by email_count

APPARATUS AND METHOD FOR PERFORMING FORENSIC ACTIVITY THROUGH AUTOMATIC LOG ANALYSIS

TECHNICAL FIELD

The present disclosure relates generally to processing data, including one or more techniques for performing forensic activity through automatic log analysis.

BACKGROUND

Computer networks typically include information technology (IT) infrastructure components, which are the things used to develop, test, monitor, control or support IT services. The primary IT infrastructure components are hardware platforms, operating system platforms, applications, data management and storage systems, and networking and telecommunications platforms. IT infrastructure components include servers, storage, networking and applications. Computer hardware platforms include client machines and server machines. Operating system platforms include platforms for client computers and servers. Operating systems are software that manage the resources and activities of the computer and act as an interface for the user. Enterprise and other software applications include software from SAP and Oracle, and middleware software that are used to link application systems. Data management and storage is handled by database management software and storage devices that include disk arrays, tape libraries, and storage area networks. Networking and telecommunication platforms include switches, routers, firewalls, load balancers (including the load balancers of cloud services), application delivery controllers, wireless access points, VoIP equipment and WAN accelerators. IT infrastructure includes the hardware, software and services to maintain websites, intranets, and extranets, including web hosting services and web software application development tools.

By monitoring IT infrastructure components, administrators can better manage these assets and their performance. Performance, availability and capacity metrics are collected from the IT infrastructure components and then uploaded to a management server for storage, analysis, alerting, and reporting to administrators. Software agents may be used to collect events and metrics about IT infrastructure components. For instance, an agent may be installed on the IT infrastructure components, and to monitor the IT infrastructure component. Agents may be used to monitor various aspects of IT infrastructure at various layers from low level hardware to top layer applications.

IT environments can include diverse types of data systems that can store large amounts of diverse data types generated by different devices. For example, a big data ecosystem may include databases, cloud computing services, and other data systems that store passively or activated generated data, including machine-generated data ("machine data"). The machine data can include performance data, diagnostic data, or any other data that can be analyzed to diagnose equipment performance problems, monitor user interaction, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding, and effectively utilizing the data when performing troubleshooting on these systems. To reduce the potentially vast amount of data that may be generated, some data systems pre-process data based on anticipated data analysis needs. In particular, specified data may be extracted from the generated data and stored in a data system to facilitate efficient retrieval and analysis of those data items at a later time.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. For instance, the machine data may allow IT operations teams to uncover root causes of alerts and predict issues. The data logs may be collected from all components on an organization's IT infrastructure and intelligently analyzes logs to highlight anomalous events.

Although the availability of vastly greater amounts of diverse data systems provides opportunities to derive new insights, it can also give rise to technical challenges to search for and analyze the data. Tools exist that allow an analyst to search data systems using data query language (DQL) queries to locate relevant logs when troubleshooting. However, querying requires indexing, which can increase query speeds, but also requires computing processing, affect computing speeds, and may impact the speed of data modification. Indexing requires effort from an user since different log file types requires a different manual configuration setup by the user. In addition, since each system has many interconnected components, a user will need to have deep domain knowledge and expertise to know how the different components in a system work together in order to when what to look for when troubleshooting the data logs and writing DQL queries. Thus, the tools that allow users to search and analyze large sets of log events involve advanced searches that requires constant indexing, user familiarity with DQL, and advanced users with domain knowledge.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

The present disclosure relates to methods and apparatus for performing automatic log analysis. An aspect of the subject matter described in this disclosure is implemented in a method of performing forensic log analysis. The method includes obtaining log files from an operating system, an application, a server, or a device. The method also includes parsing data from the log files to generate categories including at least exceptions, keywords, severity levels, resources, or classes, where each type of category has a respective category weight value. The method also includes identifying phrases based at least in part on the categories. The method further includes generating a sentiment score for a log line from the log files based at least in part on the categories, category weight values, or the phrases.

Another further aspect of the subject matter described in this disclosure can be implemented in a system for performing forensic log analysis. The systems includes a processor and a memory accessible by the processor and storing computer-readable instructions. The processor being configured to obtain log files from an operating system, an application, a server, or a device. The processor is also configured to parse data from the log files to generate categories including at least exceptions, keywords, severity levels, resources, or classes, where each type of category has a respective category weight value. The processor is further configured to identify phrases based at least in part on the categories. The processor is further configured to generate a sentiment score for a log line from the log files based at least in part on the categories, category weight values, or the phrases.

Another further aspect of the subject matter described in this disclosure can be implemented in a non-transitory computer-readable storage medium storing instructions which when executed by at least one processor causes the at least one processor to obtain log files from an operating system, an application, a server, or a device. The processor is also configured to parse data from the log files to generate categories including at least exceptions, keywords, severity levels, resources, or classes, where each type of category has a respective category weight value. The processor is further configured to identify phrases based at least in part on the categories. The processor is further configured to generate a sentiment score for a log line from the log files based at least in part on the categories, category weight values, or the phrases.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 6 illustrates an example of auto detecting data from a raw log line in accordance with one or more techniques of this disclosure.

FIG. 9A illustrates an example of an advanced user query search using data query language (DQL) to find relevant logs.

FIGS. 10A-D illustrates an example of performing forensic log analysis in accordance with one or more techniques of this disclosure.

Like reference numbers and designations in the various drawings indicate like elements.

DETAILED DESCRIPTION

Figure 1:
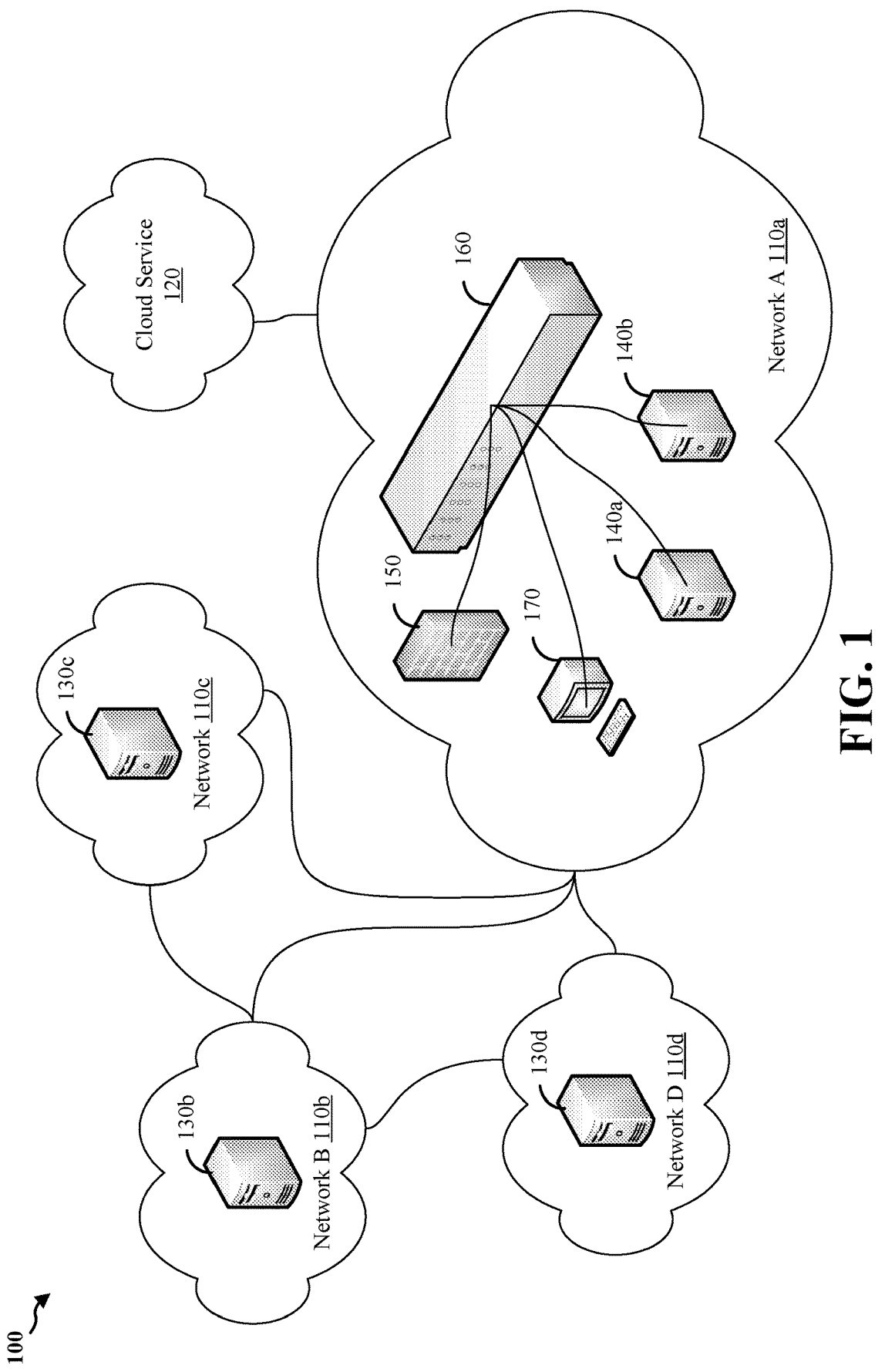
FIG. 1 illustrates an example diagram of a network system.

The following description is directed to some exemplary aspects for the purposes of describing innovative aspects of this disclosure. However, a person having ordinary skill in the art will readily recognize that the teachings herein can be applied in a multitude of different ways.

Related systems have implemented methods of searching, viewing, and analyzing log data to uncover root causes of issues and predict issues when performing troubleshooting after receiving alerts. These related systems provide operational intelligence that requires organizations to collect, index, and search machine-generated data from various websites, applications, servers, networks, and devices. In these related systems, an advanced user will need to learn vendor-specific data query language (DQL) to query a database to find relevant logs. Furthermore, the advanced user often has to run multiple queries in a "guess and check" manner order to find relevant logs. Even after running dozens of iterations of queries there is no guarantee that the advanced user has identified the issue, much less locate relevant data logs relevant to the issue.

Generally, all log management solutions look similar and have a similar flow process. Each log management solution begins with an edit box to receive a user query using DQL or a vendor specific DQL (not SQL) language to type the query and find the issue. The user must have deep domain knowledge in order to filter out data logs and find relevant log lines that he or she cares about. In addition, these related systems require indexing in order run queries to create pointers to where data is stored within a database for optimized querying.

Indexing is a way to sort an unordered table into an order that will maximize the query's efficiency when searching. When a table is unindexed, the order of the rows is likely not discernible by the query as optimized in any way and the query will therefore have to search through the rows linearly. In other words, queries will need to search through every row to find the rows matching the conditions. Typically, an indexer must first identify a set of keywords in each event and then associate the identified keyword each stored keyword with reference pointers to events containing that keyword. When an indexer subsequently receives a keyword-based query, the indexer can access the keyword index to quickly identify events containing the keyword. However, indexing is computationally intensive, tedious, and takes a long time to complete. Indexing may also slow down performance when adding or updating data. Indexing takes effort from a user since different log file types (e.g., Firewall, router, MySQL) requires different manual configuration setups by the user. In addition, the user is required to be familiar with the domain (log type) and advanced regular expression techniques.

In addition, to indexing, related systems that utilize a query to locate relevant logs also requires users to be comfortable with writing DQL queries. This means that a user must construct a DQL query with a correct syntax in a dialog box when searching for relevant data logs. A user must also have deep domain knowledge of the entire system and components of the system since users need to be aware of interesting keywords or related keywords that may not be readily apparent in the alerted notification when putting together DQL queries. For instance, when trying to troubleshoot an error for a firewall from a data log, a term such as "failed connect to a database" will not explicitly appear in the log file of a firewall because a firewall log is not a database log. Instead, a user must know that the relationship between a firewall and database and, based on previous experience or technical knowledge, that the alerted error for the firewall may be connected to a database.

Thus, a user must try different DQL queries with different keywords to know what issue to look for and then to locate the relevant data log. This means that a user must be knowledgeable about all components in the system to understand how individual components may affect other components in the system. Accordingly, it is not enough to simply know how to write the DQL query against the database. Instead, based on their technical expertise or previous experience with related issues, the user must know what to look for, where to look for, or when the error may have occurred to understand why the error occurred.

Aspect of the present disclosure create an easier and more efficient way to troubleshoot data logs without requiring search dialogs, without using DQL queries and removing labor-intensive analysis. For instance, aspects of the present disclosure allow even basic users to quickly understand why a failure occurred and quickly identify, fix, and learn to maximize service availability. By doing so, basic users may more easily locate relevant data logs and analyze the related relevant data logs without knowing complicated DQL language or having deep domain knowledge. In addition, unlike the related systems, users will not need to use a "blind" guesswork approach when writing different queries to locate the relevant data logs and understand the query results. Furthermore, aspects of the present disclosure reduce mean time to recover (MTTR) and eliminate the need to build and maintain indexes. This in turn significantly reduces troubleshooting and root cause analysis times, avoids incident war room scenarios, and helps users to not only understand what the cause is, but what should be fixed to resolve the issue for good.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing circuitry). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example network system 100 configured to implement one or more techniques of this disclosure. The network system 100 includes networks 110a, 110b, 110c, 110d, and a cloud service 120, variously interconnected through the Internet. The network system 100 may include more networks similar to network A 110a. The networks 110a, 110b, 110c, and 110d may be or include a local area network. The networks 110a, 110b, 110c, and 110d may have a physical layers and transport layers according to IEEE 802.11, Ethernet, or other wireless or wire-based communication standards and protocols. Network A 110a includes at least a firewall 150, a switch 160, servers 140a, 140b, and a client computer 170, which may be IT devices. Network A 110a may include more IT devices. One or more of the IT devices in network A 110a may run a collector routine. Network B 110b includes a server 130b having a monitor service (not shown). Network C 110c and network D 110d include respective servers 130c, 130d having a respective proxy (not shown).

The cloud service 120 is a computing service made available to users on demand via the Internet from a cloud computing provider's servers. The cloud service 120 provisions and provides access to remote devices and systems to provide elastic resources which may scale up or down quickly and easily to meet demand, are metered so that the user pays for its usage, and are self-service so that the user has self-service access to the provided services.

The servers 130b, 130c, 130d, 140a, and 140b are computing devices that utilize software and hardware to provide services. The server 130b, 130c, 130d, 140a, 140b may be server-class computers accessible via the network 140, but may take any number of forms, and may themselves be groups or networks of servers.

The firewall 150 is a hardware or software based network security system that uses rules to control incoming and outgoing network traffic. The firewall 150 examines each message that passes through it and blocks those that do not meet specified security criteria.

The switch 160 is a computer networking device that connects devices together on a computer network by using packet switching to receive, process, and forward data from an originating device to a destination device.

The client computer 170 is shown as a desktop computer, but may take the form of a laptop, smartphone, tablet or other, user-oriented computing device.

Figure 11:
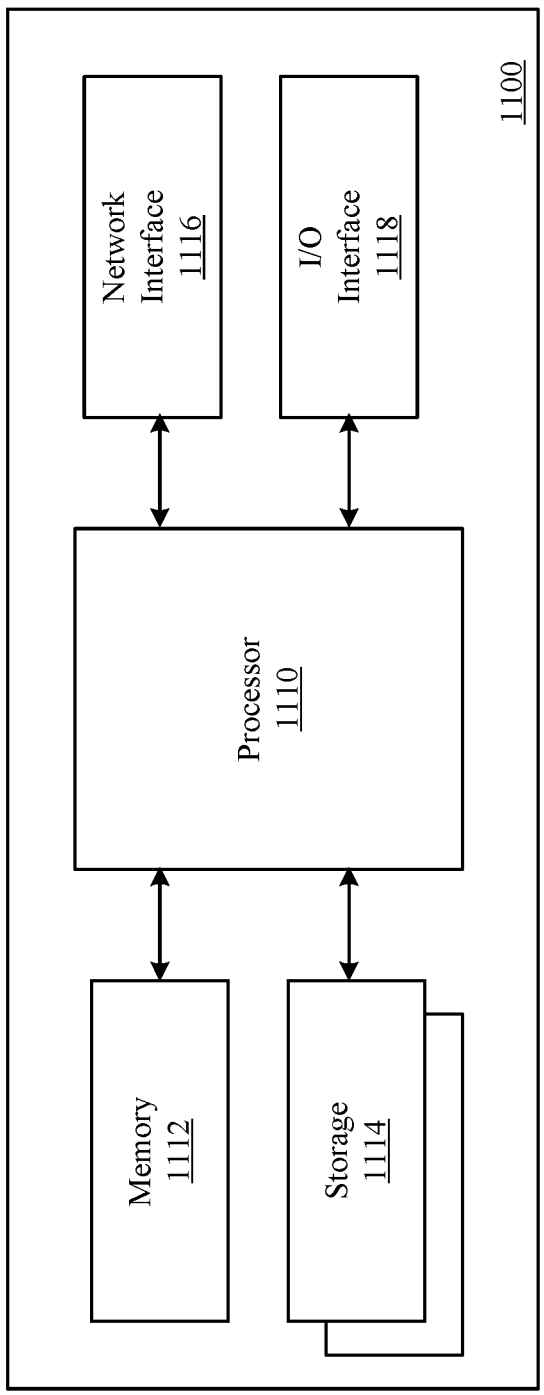
FIG. 11 illustrates a block diagram of a computing device.

The servers 130b, 130c, 130 , 140 , 140 , firewall 150, switch 160 and client computer 170 are IT devices within the system 100, and each is a computing device as shown in FIG. 11. FIG. 11 shows a hardware diagram of a computing device 1100. The computing device 1100 may include software and/or hardware for providing functionality and features described herein. The computing device 1100 may include one or more of: logic arrays, memories, analog circuits, digital circuits, software, firmware and processors. The hardware and firmware components of the computing device 1100 may include various specialized units, circuits, software and interfaces for providing the functionality and features described herein.

As shown in FIG. 1, log management solutions collect data logs from applications and from switches, routers, firewalls, and other devices. These data logs are collected into one repository so a user may run searches on these data logs from a single place—rather than logging into different machines to troubleshoot. Many companies are building these platforms as hosted solutions in the cloud, Software as a Service (SaaS) solutions, or an on-premise solution. However, these platforms all generally share a similar troubleshooting process of receiving an alert (or problem), looking into log management solutions, and searching in the logs for a solution to what was causing the problem, as will be described in more detail below in FIG. 2.

Monitoring involves using a monitoring system that checks for common or known problems and alerting when predetermined thresholds are crossed. Specifically, monitoring systems may check an effectiveness or performance of underlying systems, applications and infrastructure, either manually or by using automation. Through monitoring, users may be alerted to any potential slow-downs or disruptions.

On the other hand, observability is an overall approach that focuses on monitoring and analyzing the outputs of the applications and infrastructure they run on. Specifically, observability allows full visibility into and control over systems, hybrid infrastructure, and applications by using the data outputs coming from logs, infrastructure, and applications. When issues arise, observability enables teams to triage, troubleshoot, and understand the state of the system and the reasons behind those issues. Once those previously unknown issues are identified, a system can monitor for those issues to ensure that they do not reoccur.

In other words, monitoring alerts when something is wrong and observability endeavors to understand why. Although they each serve a different purpose, monitoring and observability complement each other. In many ways, observability is a superset of core monitoring principles and technologies. An observable system is easier to monitor. Monitoring harvests quantitative data from a system through queries, traces, processing events, and errors. Once the quantitative data is available, observability transforms them into insights and analysis, which helps determine the required changes or metrics that need tracking.

Figure 2:
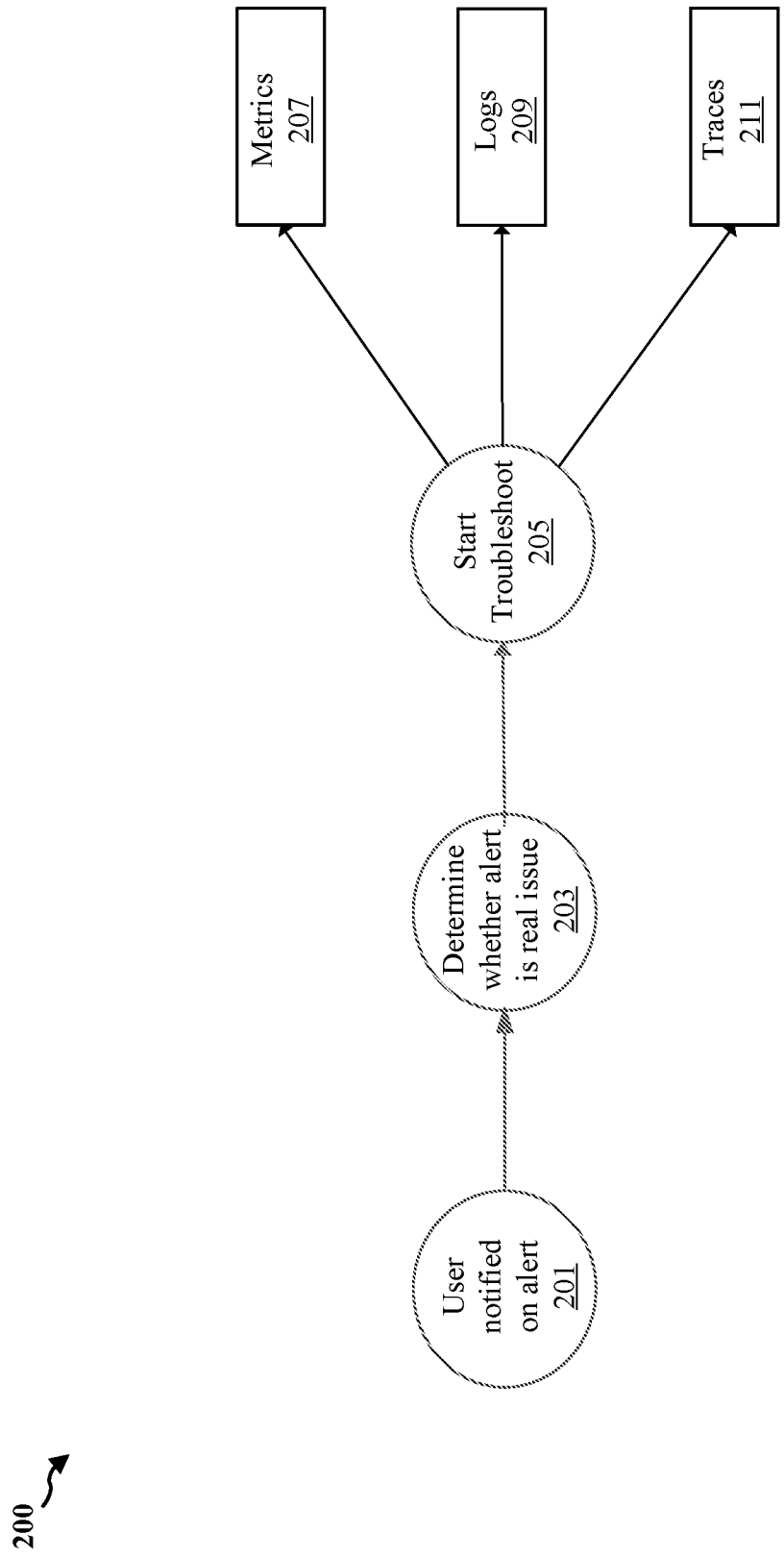
FIG. 2 illustrates an example diagram for a log troubleshooting process.

FIG. 2 illustrates an example diagram for a log troubleshooting process. Specifically, FIG. 2 shows a high-level flow process 200 for troubleshooting through observability. Observability utilizes logs, metrics, and traces to provide enough data from the system to help solve current and potential issues.

At step 201, a user (or admin) may first be notified of an alert. This alert may be notified through text messages, emails, a voice calls, or the like. In some examples, an alert may be triggered because a certain threshold was crossed. For instance, a certain compute or resource may be unhealthy so an alert related to the unhealthy compute or resource is issued to notify that a user of the issue. The user must then examine it further to understand what is causing the problem by looking into the machine-generated log or application-generated log to understand the problem.

The method of delivery may be determined by an escalation chain assigned to the alert's matching alert rule. Alert rules may determine which alerts are additionally routed as alert notifications, as well as how they are routed. The alerts may be alert conditions based on log events and log pipelines. These alert conditions may use regular expression patterns to match ingested logs and trigger alerts to be sent when these log events or anomalies occur.

At step 203, the user may then determine whether the alert is a real issue or a false alarm. Since alerts do not provide a whole picture, but, instead, provide an indication that further investigation is needed into the component or issue that generated the alert, the user may initially determine whether the issue is warranted before taking steps to resolve and respond to an alert. As an example, the user may identify whether the datapoint is abnormal. As another example, the user may need to understand the context of the alert. In yet another example, the user may need to identify other related alerts to correlate the alert. If is determined that the alert is not a real issue, then the process 200 may end. If it is determined that the alert is a real issue, then the process 200 proceeds to a troubleshooting step.

At step 205, the user may begin troubleshooting to understand the issue indicated in the alert. Observability provides a visible overview of the "big picture" of the issue through metrics 207, logs 209, or traces 211 (or distributed tracing). Distributed tracing involves the operating and monitoring of modern application environments. As data moves from one service to another service, distributed tracing is the capacity to track and observe service requests to understand the flow of requests so a user may pinpoint weak spots in the system, such as failures or performance issues. Thus, metrics 207, logs 209, and traces 211 provide a complete picture of a software environment and performance of how the software environment is performing.

The first step of troubleshooting is to determine what is going on in the environment. By having metrics 207 instrumented over an environment, users can clearly see when issues are occurring and act on those issues before they blow up. Metrics 207 may inform whether there is a problem, but they do not inform of the root cause. The second step of troubleshooting is locating where the problem is happening. Since the complex systems have so many moving parts, it is imperative to locate the right pieces to fix via traces 211. Traces 211 not only provide insight into poorly performing services, but traces 211 may identify interactions between services that are performing poorly, which contributes to poor overall performance or availability. Traces 211 also help identify which kinds of transactions or customers may be affected, and on which systems. The third step of troubleshooting is to determine why is the problem happening. Logs 209 contain all the unstructured data that reveal exactly what happened, when and why it happened, and the context and details required to build the best solution for that issue.

Metrics 207 may be a wide range of values, monitored over a period of time. Metrics 207 are often key performance indicators (KPIs) such as central processing unit (CPU) capacity, memory usage, latency, or any other measurement of the health and performance of a system. Changes in metrics allow teams to gain a better understanding of the end performance of the system. For instance, understanding fluctuations in performance over time helps a user better understand the user experience, which in turn helps them improve it. Here, the metrics 207 may be examined to find related alerts metrics, correlated metrics, or to understand configuration.

Logs 209 are historical records of the system that are time-stamped. The logs 209 typically come in either binary or plain text as well as structured logs which combine text and metadata, which makes them easier to query. Logs 209 allow a user to look back and see what has gone wrong within a system. Here, the user may locate logs 209 in order to find relevant log lines that may have caused the alert.

Traces 211 are a way to record a user's journey through an application or system. A trace records a user's interaction and requests within the system, starting from the user interface through to the back end systems, and then back to the user once their request has been processed. Every operation performed upon the request is recorded as part of the trace. In a complex system, a single request may go through dozens of microservices. For instance, every operation performed from clicking on a tab within an application to the tab loading in the GUI is recorded as part of the trace. Each of these separate operations, or spans, contains crucial data that becomes part of the trace. For instance, traces 211 are critical for identifying bottlenecks in systems or seeing where a process broke down within the application or system.

Combining metrics 207, logs 209, and traces 211 from a variety of sources into a single platform allow users to collaborate more effectively to see a big picture view and achieve greater visibility into systems when troubleshooting. This allows a reduction of MTTR and provides a more collaborative way to develop, deploy, and iterate on systems and applications.

As described herein, aspects of the present disclosure focuses on the issue of locating relevant log lines that are related to an alert during troubleshooting. Sifting through these logs in real-time or post-mortem to pin point the problem can take hours and is akin to finding a needle in the alert/log haystack. Furthermore, in related systems, the trouble shooting process presents a challenge due to context switching and relying on manual interpretation of events and technology-specific knowledge. Accordingly, reviewing data logs is challenging, time-consuming, and often times requires expertise to actually understand them. Thus, it would be helpful to utilize a method to automatically analyze every element of a log, data, and event at the time of ingestion without the need to learn proprietary search query languages. In addition, it would also be helpful to analyze the log data in context immediately from any performance metric dashboard or graphs.

For example, the present disclosure may be used to resolve hardware issues when a Kafka broker stops. A team may encounter a server that was still functioning but the Kafka broker lost leadership and was not properly replicating data. Before with related systems, the application logs from Kafka itself were useless in determining the cause of the problem and multiple users would have to spend many hours trying to figure out exactly what the problem was. Using aspects of the present disclosure, a user may receive an alert for the same issue on a different server. The user may then discover the problem immediately—not from institutional knowledge or running multiple queries in a data log database, but rather from locating relevant log messages along with the alert.

As another example, operations teams must be able to proactively identify issues when customer experience a performance issue related to a capacity constraint. In this instance, an on-call engineer may receive a metric-based alert indicating response time had degraded. In previous related systems, the on-call engineer would need to manually read through the actual logs to surface an issue, which was simply not feasible with 800,000+ messages to scroll through. Using aspects of the present disclosure, an on-call engineer is able to quickly view the related log anomalies. The log anomaly may reveal a bug that requires manual intervention to resolve in the short term, but also provides data required to create a follow-up action for preventing this issue in the future. In this case, the log anomaly may represent 0.04% of the total log volume during the 90 minutes, where the performance issue was discovered.

As mentioned above, the majority of log management solutions look similar and follow a similar flow process. Each device, system, or application will generate their own logs and are kept locally. Users may centralize their logs in a unified space by using a log collector or aggregator. Once the logs are centralized, users can then search through the logs to find the information they need. In addition, many solutions provide log alerting capabilities to notify when certain log conditions have been identified.

Figure 3:
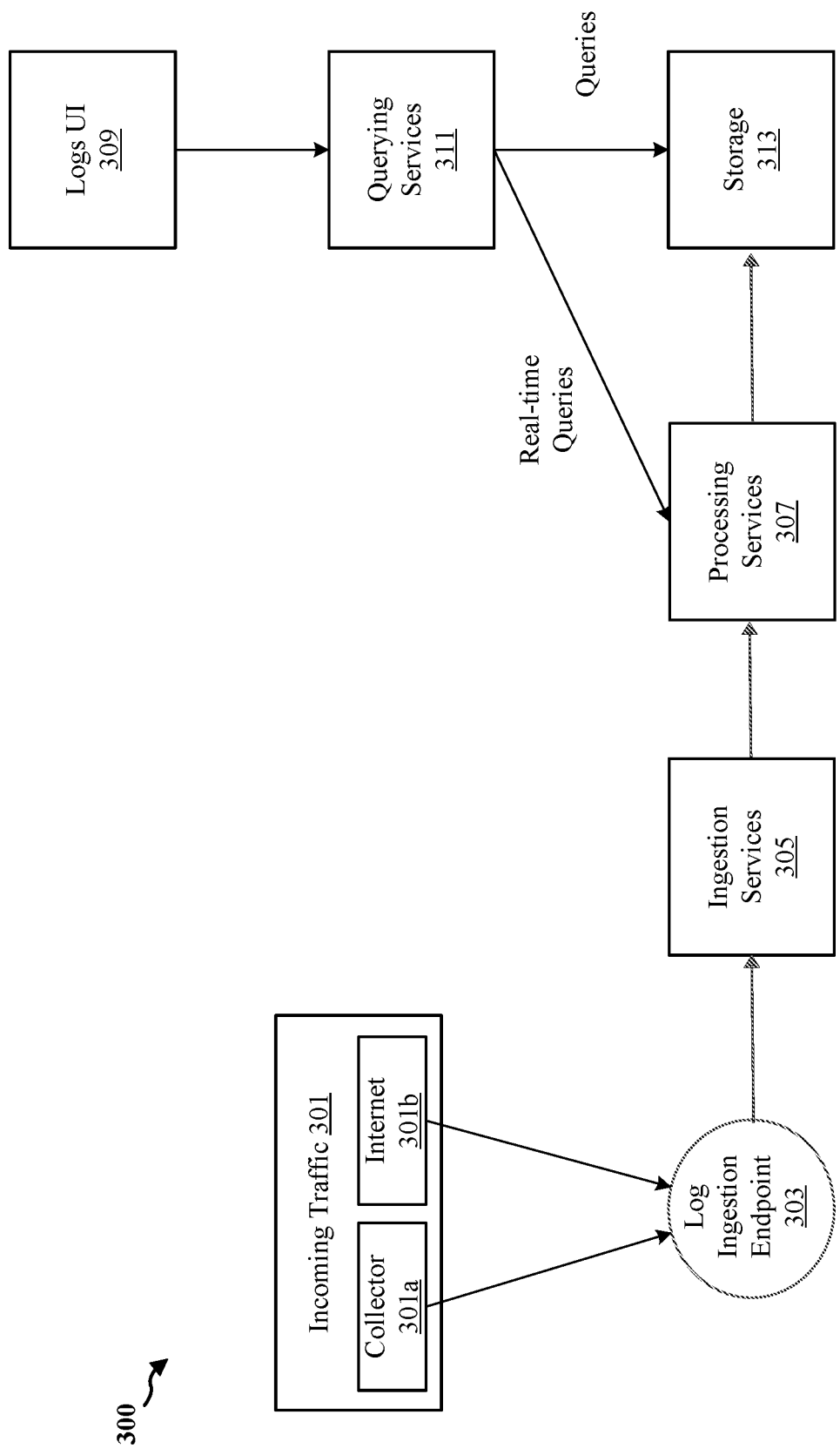
FIG. 3 illustrates a flowchart of an example method of a log processing flow.

FIG. 3 illustrates a flowchart of an example method 300 for processing logs. Logging generates and records events that occur in a technical environment and stores them for review. Logging may help explain what is happening at the time the log is created. Without logging all events, a user may have a difficult time identifying issues or determine the root cause of a problem. At a high-level, the log processing process includes collecting data locally using agents or sent by a data source, sending the collected data to an ingestion layer, storing logs as long as they are needed for compliance, and analysis through search or a live analysis stream, and alert creation.

Log processing is the process of collecting and centralizing logs and event information from any technologies from on-premise to cloud, infrastructure to applications, to gain insight into a systems environment. Log data is aggregated over time and retained and accessible for a predefined period of time. Log processing also helps a user or admin understand the log data since systems can generate thousands of logs per day and locating the right log is challenging. When log data is analyzed, log data can provide more insight and context into what is happening. Log analysis can include analyzing every log for the severity written in the log and being able to search for the severity that is the target of an investigation.

Logs events may be received via incoming traffic 301 from various resources such as a host machine, log collectors 301a or log servers, cloud services, the Internet 301b, or other applications and technologies. The log events are then forwarded as raw logs to a log ingestion endpoint 303. Log ingestion refers to the process of formatting and uploading log data from external services like hosts, applications, and cloud-based logging services. When ingesting log data, information in the log line is parsed to make it available for searching and data analysis. The log ingestion endpoint 303 forwards raw logs to the log ingestion services 305 for further processing.

Ingestion services 305 may receive log events as JSON payloads and performs validation, authentication, authorization, and resource mapping. The ingestion services 305 may use an application programing interface (API) to retrieve logs events from different collection sources. When setting up the system, resources and services may be configured to forward data to one of various log ingestion methods.

Processing services 307 may consume ingested logs, apply anomaly detection algorithm, and prepare logs for storage. Anomalies are changes in log data that fall outside of normal practice. These anomalies may be detected based on parsed log event structures. The log events may be channeled into pipelines analyzing structure patterns looking for anomalies. The processing services 307 may also trigger alerts based on pipeline and alert condition configurations. Log alerts are alert conditions based on log events and processing pipelines. Alert conditions may use regular patterns to match ingested logs and trigger alerts.

A logs user interface (UI) 309 may receive user inputs such as log queries, added pipelines, and log usage and also to display querying results. Log query language expands the standard search capabilities beyond keyword searches and filtering to narrow down information when troubleshooting.

Querying services 311 may process queries received from the logs UI 309 and sends saved queries for storage. For instance, the querying services 311 may send real-time queries to the processing services 307 and saved queries to the storage 313. The storage 313 then stores events and anomalies from log processing, and queries from querying services 311.

Figure 4:
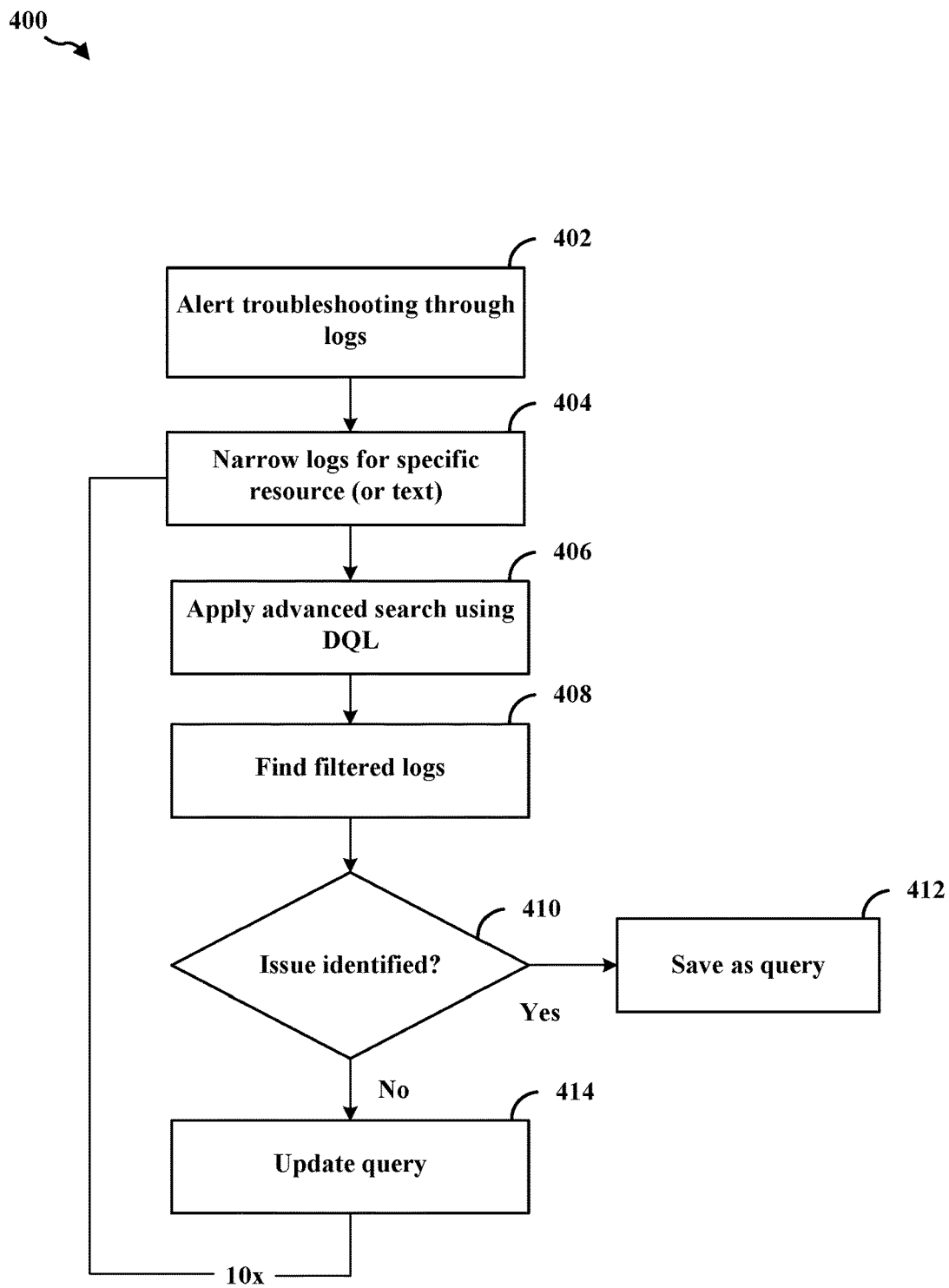
FIG. 4 illustrates a flowchart of an example method for troubleshooting through logs in accordance with one or more techniques of this disclosure.

FIG. 4 illustrates a flowchart of an example method for troubleshooting through logs in accordance with one or more techniques of this disclosure. Specifically, FIG. 4 shows an example diagram of a troubleshooting process 400 for locating logs using an advanced search. Generally, troubleshooting solutions in related systems all follow a similar flow.

At step 402, the process 400 includes alerting troubleshooting through logs. Log alerts are alert conditions based on log events and processing pipelines. The log alerts may be generated based on filters and conditions configured for resources. As an example, referring back to FIG. 2, a user may be notified of an alert through various methods.

At step 404, the process 400 includes narrowing logs for specific resources or text. There may be millions of events generated for the logs since each device, system, or application will generate their own logs. Using query language, the process 400 includes narrowing down information to quickly find relevant logs when troubleshooting.

At step 406, the process 400 includes applying an advanced search using DQL (as shown in example 900a in FIG. 9A). Advanced searches may be a powerful tool for advanced users with DQL knowledge. However, advanced search requires indexing, a familiarity with DQL, and deep domain knowledge, technical expertise, and prior experience with related alerts.

Indexing is happening at the initial moment that logs are collected from a given machine. For instance, a user may plan to query data based on severity level. This means that when each log line is parsed, the user is trying to find a value of the severity level and use that value as an index. The result is that when a user searches for all logs with a level debug, the query will execute quickly. However, this is extremely tedious work that a user must perform at a front-end. For example, for every different log file coming from a firewall log, coming from a switch log, or coming from a database, the user must go into the log file and identify that the first three arguments in the string describe the severity level of the log line. The data in the string is then parsed out and used as an index. If there is no indexing, the query will be significantly slower.

In addition, advanced search requires users familiar with DQL. FIG. 9A shows an example of an query written in DQL 901. DQL is part of a sub group of SQL sub-languages. DQL statements are used to query the data and information contained in schema objects. The purpose of DQL commands is to return a schema relation based on the query passed to it. Most engineers are able to guess DQL language, but they do not know how to properly write the DQL queries. For instance, if an engineer can't write a query, then an engineer won't be able to do any troubleshooting, optimization, or performance monitoring. Logging tools require proprietary query knowledge to search and filter log data for effective troubleshooting, delaying identification and resolution of business-critical issues.

Furthermore, advanced search also requires advanced users with domain knowledge. Users must have deep domain knowledge since users need to know which keywords to look for in the log files. For instance, "failed connect to a database" may not appear in a firewall log because a firewall log is not a database log. Accordingly, unless an advanced user knows exactly what keywords to look for based on expertise or previous experience, a basic user will need to try different queries in a trial and error approach. Therefore, it is not enough for a user to know how to write the query in DQL against the database, but a user also needs to know what he or she is looking for based on previous experience or technical expertise.

At step 408, the process 400 includes finding filtered logs. After the user applies the advanced search, the process 400 returns filtered logs. At this point, a user may analyze each log line in the filtered log to determine whether the issue is identified.

At step 410, the process 400 includes determining whether an issue was identified in the filtered logs. For instance, the user may determine whether the log line is abnormal. In an example, the user may show X number of logs lines before and after the specific source to determine if the issue is identified. In another example, the user may look at metrics or configuration changes to determine if the issue is identified. Based on a determination that the issue was identified, then the process 400 may, at step 412, proceed to save the query used in the advanced search as a query. This allows a user to easily use the same query in the future or to share the query with a user's team in case the same issue occurs in the future.

Based on a determination that the issue was not identified, the process 400 may, at step 414, proceed to update the query. This may involve the user zooming out to view surrounding logs and/or reducing filters to investigate logs on additional resources for updating the query. After the query is updated, then the process may return to step 404 to narrow logs. In some instances, this process may iterate up to ten different times in order to properly identify the issue.

As shown above, the process 400 is tedious and requires a lot of iterations of "guessing and checking" by using an advanced search to filter the logs, apply a DQL query, and repeating the process until a user is satisfied that he identified the issue within the filtered logs or gives up. In addition, advanced search requires indexing, users familiar with DQL, and advanced users with domain knowledge.

Figure 5:
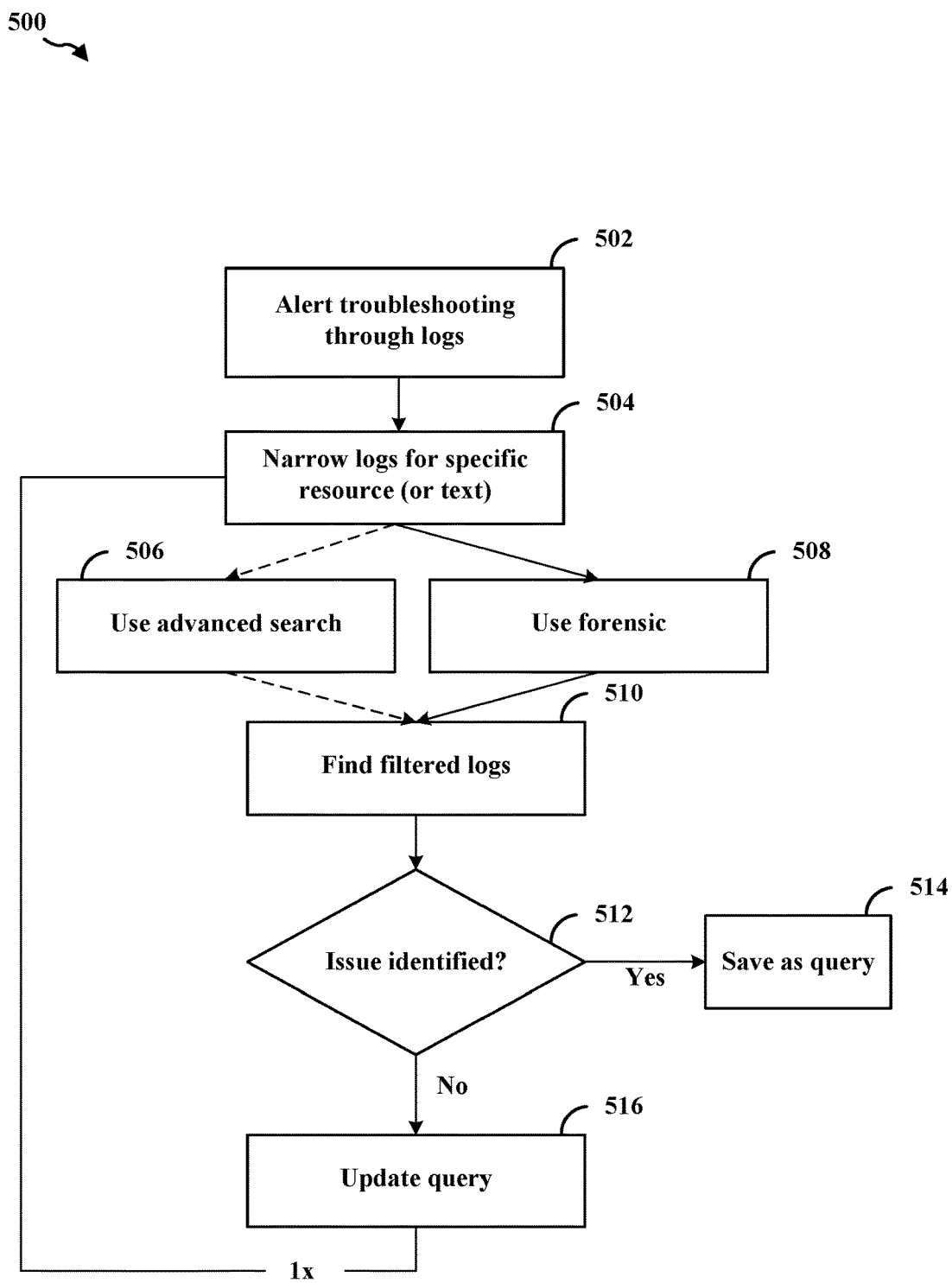
FIG. 5 illustrates a flowchart of an example method for troubleshooting through logs in accordance with one or more techniques of this disclosure.

FIG. 5 illustrates a flowchart of an example method for troubleshooting through logs in accordance with one or more techniques of this disclosure. Specifically, FIG. 5 shows an example diagram of a troubleshooting process 500 for locating logs using a forensic method. Compared to the process 400 in FIG. 4, the process 500 in FIG. 5 includes using forensics (or automatic log analysis) to find filtered logs. Simply implementing the step 518 of using forensics to find filtered logs may greatly reduce the process from 10 iterations as shown in the process 400 in FIG. 4, to one iteration. In some examples, implementing the log forensics may be performed as a supplement to the advanced search.

At step 502, the process 500 includes alerting troubleshooting through logs.

At step 504, the process 500 includes narrowing logs for specific resources or texts.

At step 506, the process 500 includes applying an advanced search using DQL (as shown in example 900A in FIG. 9A).

At step 508, the process 500 includes performing forensic analysis activity through automatic log analysis. The process of using forensics through automatic log analysis to find filtered logs generally includes extracting sentiment phrases based on autodetecting negative keywords, logged severity, and/or important fields (e.g., exceptions, classes, libraries), and generating a sentiment score for each raw log line. The process of using forensics includes obtaining all the raw log lines from log data and extracting data from the raw log lines. Next, categories are created to define the dimensions. This allows phrases to be identified in the raw log lines and then sentences to be extracted that are related to a keyword of the phrase. The categories are used to identify exceptions, keywords, and to extract severity levels, classes, and phrases. Each raw log line is then categorized according to the created categories. Finally, a sentiment score is generated for every log line based on the categorized data and identified phrases. In some examples, the sentiment score may correspond to an amount of interest. The sentiment score gives the user an ability to understand each log line based on an overall sentiment score. A more detailed process of using forensics will be described in further detail in FIGS. 6 and FIGS. 7.

At step 510, the process 500 includes finding filtered logs. After the user applies either advanced search or forensics, the process 500 returns filtered logs. At this point, a user may analyze each log line in the filtered log to determine whether the issue is identified.

At step 512, the process 500 includes determining whether an issue was identified in the filtered logs. For instance, the user may determine whether the log line is abnormal. In another example, the user may show X number of logs lines before and after the specific source to determine if the issue is identified. As another example, the user may look at metrics or configuration changes to determine if the issue is identified. Based on a determination that the issue was identified, then the process 500 may, at step 514, proceed to save the query used in the advanced search as a query. This allows a user to easily use the same query or to share the same query with a user's team in case the same issue occurs in the future.

Based on a determination that the issue was not identified, the process 500 may, at step 516, proceed to update the query. This process may involve the user zooming out to view surrounding logs and/or reducing filters to investigate logs on additional resources. After the query is updated, then the process 500 may return to step 504 to narrow logs. In some instances, this process may iterate up to one time in order to properly identify the issue. This is in contrast to the process 400 shown in FIG. 4 which may iterate up to 10 times to properly identify the issue.

FIG. 6 illustrates an example of a log line in accordance with one or more techniques of this disclosure. Example 600 shows a raw log line with different portions of the data using forensics to autodetect and categorize data from the log line based on created categories.

Portion 601 identifies the user logged severity level. In example 600, the severity level has been logged as "info." Generally, a severity level field corresponds to the importance of a log. For example, an "error" log is a top priority and is considered more urgent than a "warn" log. A "debug" log is usually only useful when the application is being debugged. As another example, Python has six log levels with each one assigned a specific integer indicating the severity of the log: NOTSET=0, DEBUG=10, INFO=20, WARN=30, ERROR=40, and CRITICAL=50. Debug may track detailed information useful during development. Info may provide details about what is happening behind the scenes in the application since log message can provide context when understanding the steps leading to an error. A warning may not crash an application, but it is an issue that may potentially lead to more critical errors. A warning may be a level for alerting the administrators of a potential issue. An error identifies errors and exceptions disrupting an operation such as a database error preventing a record from being saved. Despite encountering errors for an operation, in some cases, the application can continue functioning normally for other operations. A critical level identifies failures possibly leaving the application unable to function correctly. Critical level errors may include exceptions such as out-of-memory and disk running out of space.

Portion 603 indicates a class. In example 600, the class has an issue of "ReportRawEriCriticalOperation." The class is a component of code and is effectively a label. In other words, the logs are coming from code that is being executed in these classes.

Portion 605 indicates an exception. Here, the exception is "ArrayIndexOutOffBoundsException." An exception occurs when an error is detected during execution. For instance, a statement may be syntactically correct, but the function was unable to be completed. This is not a fatal error and can therefore be handled easily. However, the program will not handle the problem automatically. Instead, the programmer will have to find the line with the mistake and solve it manually.

Portions 607a, 607b, and 607c identify negative sentiment phases. Here, example 600 shows portion 607a identifying "script property exec error," portion 607b identifying "failed during script running," and portion 607c identifying "Index 1 out of bounds for length" as negative sentiment phrases. In addition, the underlined words in portions 607a, 607b, and 607c further determine specific negative keywords such as "error", "failed" and "out of" from the identified negative sentiment phrases. In some examples, each negative keyword will be assigned a particular weight. For example, "retry" has a lesser negative sentiment than "lost" which has a lesser negative sentiment than "fatal."

As shown in example 600, a basic user may not need sophisticated knowledge to read and interpret the raw log line. Instead, the created categories allow the most relevant data to be easily identified and extracted. The enhancement and enrichment of the different categories may also iterate and improve with time. Finally, the forensics process will also summarize the log line with a sentiment score generated based on the data from the categorizes. As a non-limiting example, the sentiment may be scored from 1 to 5 with 1 meaning that the interest is low enough that it is not likely what a user is looking for to a 5 which means there is likely a severe problem. Following on the non-limiting example, if a log line contains the negative sentiment keyword of "fatal" then the generated sentiment score may be scored higher than a log line that contains the negative sentiment keyword of "retry" based at least on the negative sentiment keyword of "fatal" having a higher weight than the negative sentiment keyword of "retry." Although, not pictured, in FIG. 6, the example 600 may generate a sentiment score of 4 based on the auto discovery of negative keywords ("error", "failed," "out of), severity of INFO, an exception of "ArrayIndexOutOfBoundsException", a class of ReportRawEriCriticalOperation, and the three negative sentiment phrases ("script property exec error," "failed during script running," and "Index 1 out of bounds for length 1").

Figure 7:
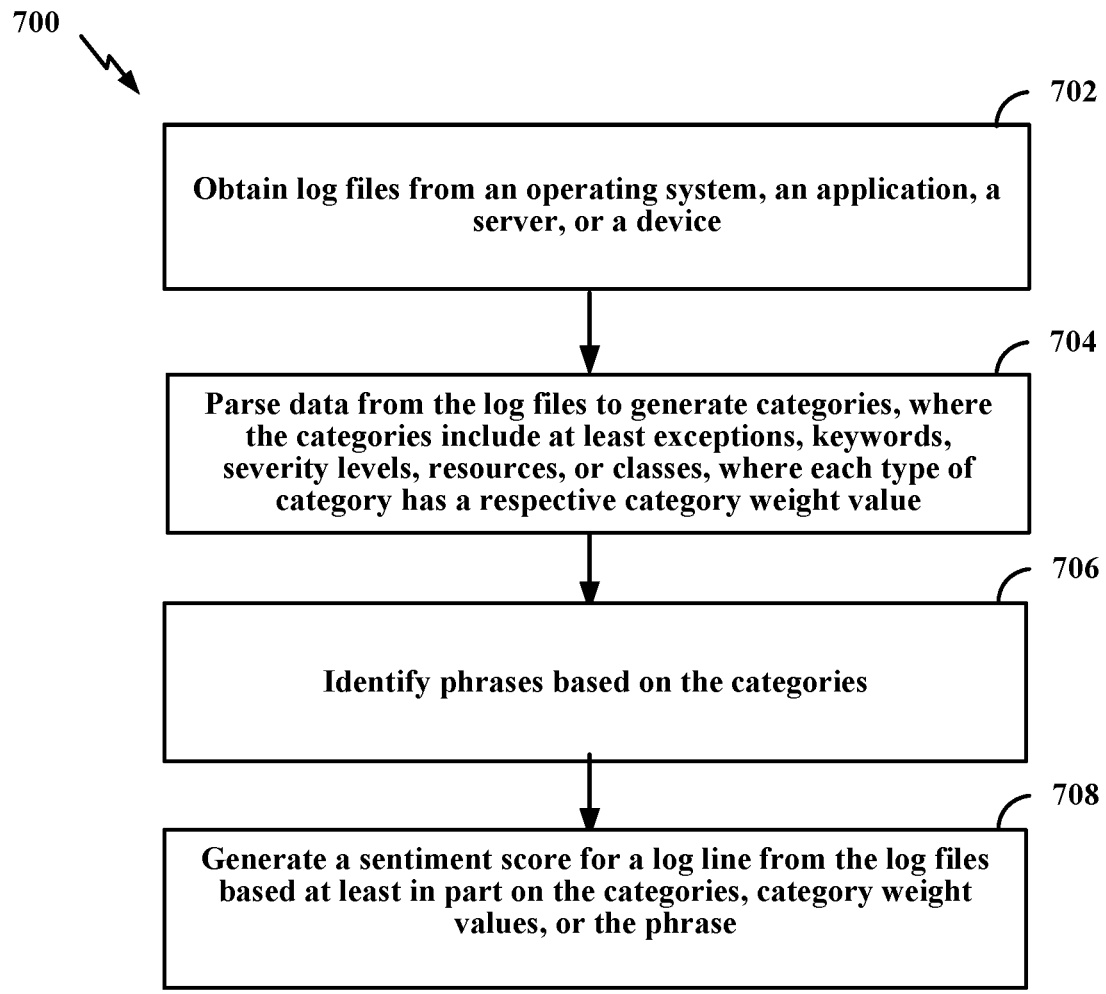
FIG. 7 illustrates a flowchart of an example method for performing forensic log analysis in accordance with one or more techniques of this disclosure.

FIG. 7 illustrates a flowchart of an example method for performing forensic log analysis in accordance with one or more techniques of this disclosure. The method 700 may be performed by an apparatus, such as the client computer 170, as described above, or the computing device 1100, as described below. In some implementations, the method 700 is performed by processing logic, including hardware, firmware, software, or a combination thereof In some implementations, the method 700 is performed by a processor executing code stored in a non-transitory computer-readable medium (e.g., a memory). The method 700 includes performing forensic analysis on log files.

At block 702, the method 700 includes obtaining log files from an operation system, an application, a server, or a device. For example, referring back to FIG. 3, log files may initially be obtained from incoming traffic 301 such as collectors 301a or the Internet 301b and then ingestion services 305 may use an API to retrieve log events from different collection sources. In some examples, the log files are obtained based on executing a query search without using DQL or a search dialog.

At block 704, the method 700 includes parsing data from the log files to generate categories including at least exceptions, keywords, severity levels, resources, or classes, where each type of category has a respective category weight value. For example, a severity level category may have a greater weight than a class category when generating a sentiment score. For example, referring back to FIG. 6, the created categories may include severity level, classes, exceptions, negative sentiment phrases. As another example, referring to FIG. 9B, the created categories may include keyword and sentiment level. As yet another example, referring to FIG. 10A, the created categories may include class, severity level, sentiment score, keyword, and resource.

At block 706, the method 700 includes identifying phrases based at least in part on the categories. For example, referring back to FIG. 6, the identified phrases include "script property exec error," "failed during script running," and "index 1 out of bounds for length 1." In some examples, identifying phrases based at least in part on the categories comprises detecting negative sentiment keywords from the phrases in the log files, where the sentiment score is further generated based at least in part on a weight of the negative sentiment keywords. For example, referring back to FIG. 6, the negative keyword of error is detected from "script property exec error", the negative keyword of failed is detected from "failed during script running", and the negative keywords of "out of" is detected from "index 1 out of bounds for length 1." In addition, each of the negative keywords of "error", "failed", and "out of" have their own respective weight based on the semantic meaning of the negative keyword. For instance, "failed" has a higher negative sentiment than "error" which has a higher negative sentiment than "out of." Accordingly, the number of negative keywords detected and the weight of each keyword will affect the sentiment score.

In some examples, identifying phases based at least in part on the categories comprises detecting a severity level logged by a user from the log files, where the sentiment score is further generated based at least in part on a weight. For example, referring back to FIG. 6, the portion 601 of the log file indicates that the severity level logged by a user is "INFO." In some cases, the message will be logged in order of increasing severity: debug is the least threatening, info is also not very threatening, warning needs attention, error needs immediate attention, and critical is the highest level of threat. The user logged severity level will also factor into the sentiment score.

In some examples, identifying phrases based at least in part on the categories comprises extracting data from data fields of the log files, where the data fields correspond to a severity level logged by a user, an exceptions field, a class field, and a library field, where the sentiment score is further generated based at least in part on a weight of the data from the data fields. For example, referring back to FIG. 6, the portion 603 correspond to a class field and the portion 604 correspond to an exceptions field.

At block 708, the method 700 includes generating a sentiment score for a log line from the log files based at least in part on the categories, category weight values, or the phrases. The sentiment score corresponds to a level of interest. In some examples, the method 700 further includes generating sentiment scores for each log line from the log files based at least in part on the categories, category weight values, and the phrases.

In some examples, the method 700 further includes determining a relevant log file based on the generated sentiment score. In some examples, the method 700 further includes saving the parsed data as a query searched based on the sentiment score exceeding a threshold. For example, referring back to FIG. 5, the process may include saving the query for future use or to share with other team members to avoid duplication of work.

Figure 8:
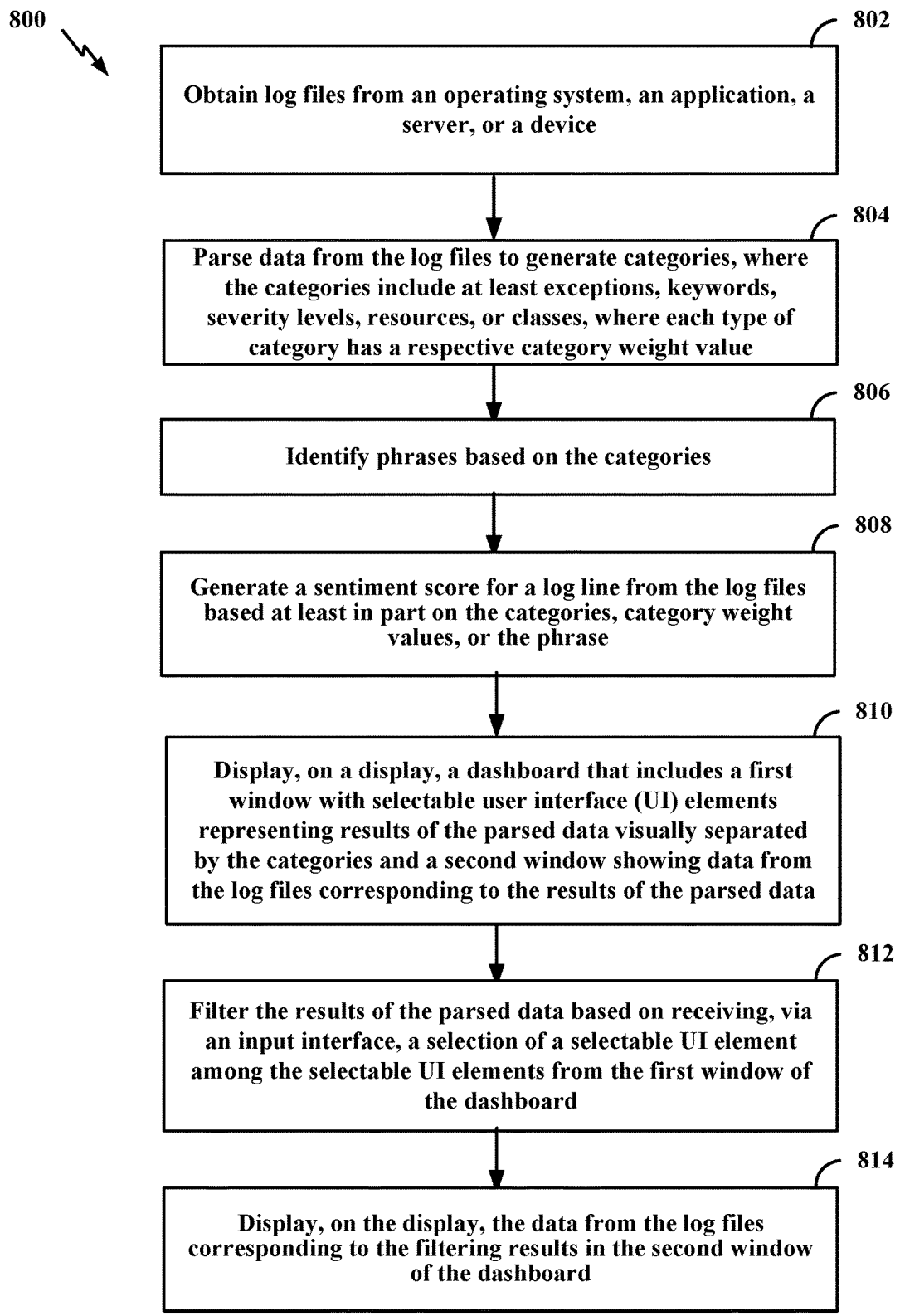
FIG. 8 illustrates a flowchart of an example method for performing forensic log analysis in accordance with one or more techniques of this disclosure.

FIG. 8 illustrates a flowchart of an example method for performing forensic log analysis in accordance with one or more techniques of this disclosure. The method 800 may be performed by an apparatus, such as the client computer 170, as described above or the computing device 1100, as described below. In some implementations, the method 800 is performed by processing logic, including hardware, firmware, software, or a combination thereof In some implementations, the method 800 is performed by a processor executing code stored in a non-transitory computer-readable medium (e.g., a memory). The method 800 includes performing forensic log analysis using a UI to filter and analyze the data.

At block 802, the method 800 includes obtaining log files from an operation system, an application, a server, or a device.

At block 804, the method 800 includes parsing data from the log files to generate categories including at least exceptions, keywords, severity levels, resources, or classes, where each type of category has a respective category weight value.

At block 806, the method 800 includes identifying phrases based at least in part on the categories.

At block 808, the method 800 includes generating a sentiment score for a log line from the log files based at least in part on the categories, category weight values, or the phrases.

At block 810, the method 800 includes displaying, on a display, a dashboard that includes a first window with selectable user interface (UI) elements representing results of the parsed data visually separated by the categories and a second window showing data from the log files corresponding to the results of the parsed data. For example, referring back to FIG. 9B, the first window of the UI dashboard lists two created categories-keyword and sentiment level. For example, as shown in FIGS. 10A-D, the first window of the UI dashboard shows five created categories (class, level, sentiment, keyword, resource) along with a pie chart, a graph menu, and the extracted data for the respective category, where each of the elements of the pie chart, the graph menu, or the extracted data are selectable to apply filters.

At block 812, the method 800 includes filtering the results of the parsed data based at least in part on receiving, via an input interface, a selection of a selectable UI element among the selectable UI elements from the first window of the dashboard. For example, as shown in FIGS. 10A-D, the first window of the dashboard for Level shows two different data extractions for the log files—"info" and "warn." In some examples, the results are filtered based at least in part on an include filter, an exclude filter, or a show phases operation. For example, referring back to FIG. 10B, in the first window showing the keyword category, a user has selected "not found" to enable a filter of "include", "exclude", or "show phrases" operation.

At block 814, the method 800 includes displaying, on the display, the data from the log files corresponding to the filtering results in the second window of the dashboard. In some examples, the second window shows data from the log files including at least a first column for a date and time, a second column for severity level, a third column for the sentiment score, and a fourth column showing a message of the log line. For example, referring back to FIG. 9B, the second window shows selected data extracted from the raw log line. In example 900B of FIG. 9B, the user has customized the second window to show "time", "logged severity level", "sentiment score", "sentiment level", "keyword phrase", and the message. For example, referring to FIGS. 10A-D, the second window shows selected data extracted from the raw log line. In example 1000A of FIG. 10A, the user has customized the second window to show "date/time," "severity level," "sentiment score," and the message.

FIG. 9A illustrates an example of a user query search using data query language (DQL) to find relevant logs. As shown in example 900a, a complicated query search 901 is required by an advanced user in order to find relevant log files.

Figure 9B:
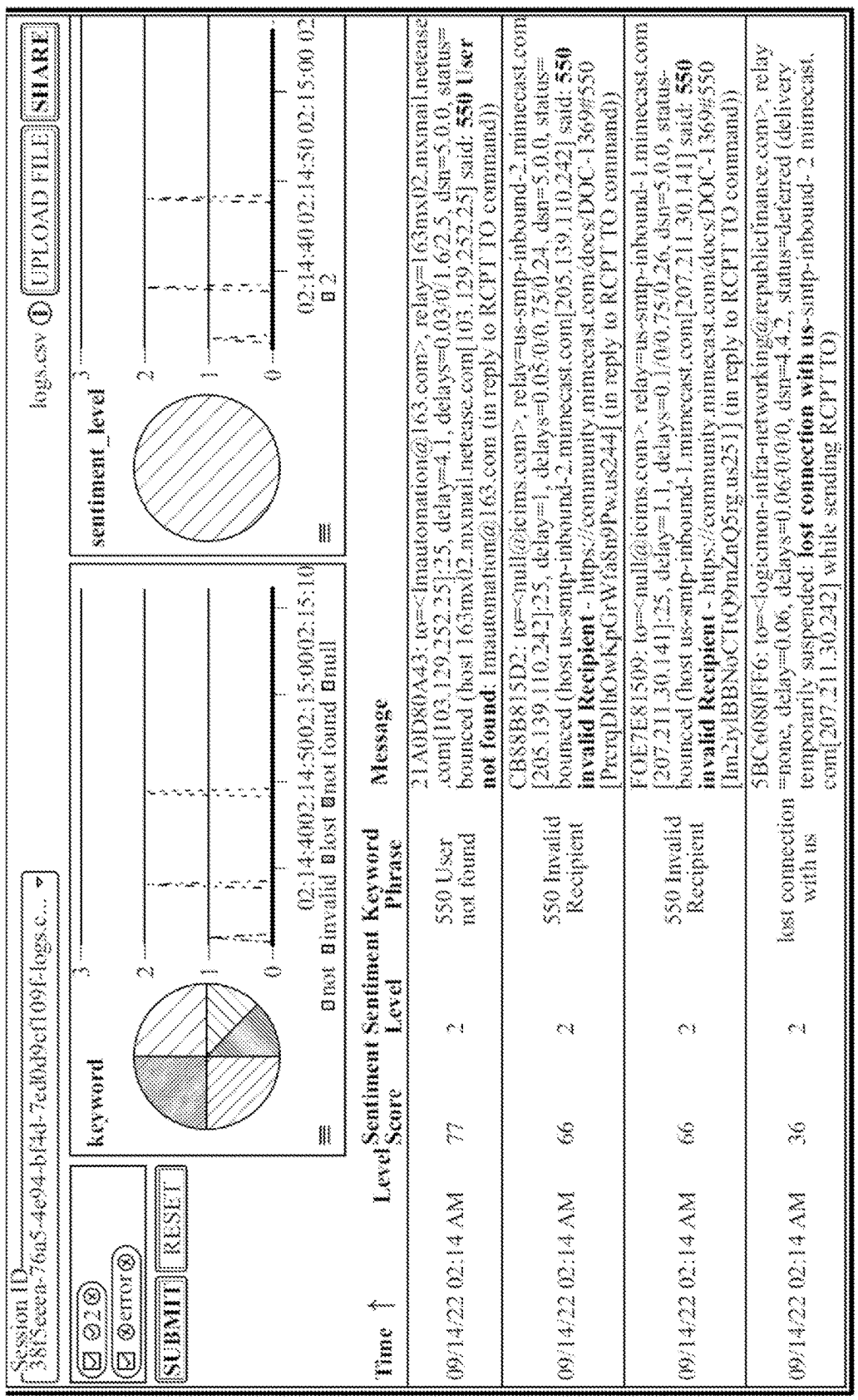
FIG. 9B illustrates an example of using forensic log analysis to find relevant logs.

FIG. 9B illustrates an example of using forensic log analysis to find relevant logs with a UI interface. As shown in example 900b, a user may simply add an include filter for "2" and a filter exclude filter of "error" through clicking on selectable graphical UI elements to obtain the same result as coming up with the complicated query search and then writing a technically correct DQL query as shown in example 900a from FIG. 9A. In addition, the user may easily identify the negative sentiment keywords from the log files and that the user logged severity level is a "2" for the filtered results of the data logs. As an example, referring back to FIG. 5, the process of filtering may be used to find the filtered logs 520 in order to more easily identify the issue by viewing the different negative sentiment keywords and user logged severity levels. This avoids the complicated process of applying advanced search using DQL 406 as shown in FIG. 4. Furthermore, the UI interface displays the results of the filtered log files in an easy to view manner where the log files are first separated by categories in a first window and the individual results of the query are displayed in a second window with relevant data extracted.

FIGS. 10A-D illustrates an example of performing forensic log analysis in accordance with one or more techniques of this disclosure. Specifically, FIGS. 10A-D show a process of using a UI dashboard to narrow log files without using any queries or search dialogs.

Figure 10A:
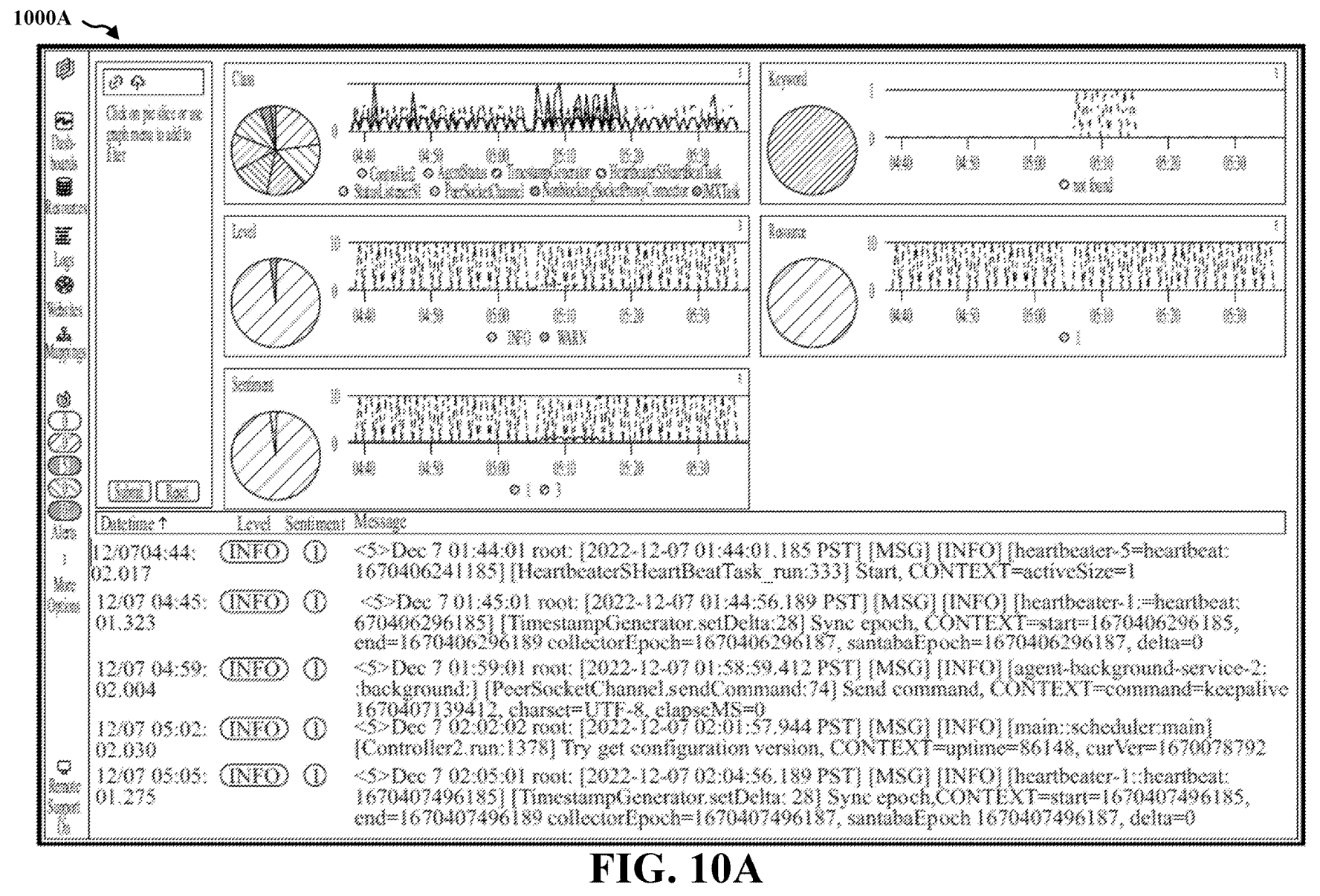

FIG. 10A shows an example 1000A of a UI dashboard that includes a first window with selectable UI elements representing identified data separated by the created categories. Here, example 1000a shows categorized data from a class, level, sentiment level, identified phrases from keyword, and resource. In addition, each created category also displays a pie chart representing the frequency that the data extracted for the category appears, the data extracted for the category plotted on a time series plot, and the different data corresponding to the categories. For example, for classes, the pie chart shows eight different classes extracted from the data logs and a plot of the different extracted classes in a time series plot. In addition, each of slices of the pie chart, the plots in the time series plot, or the extracted classes may be selectable UI elements that correspond to applying a filter based on the selected UI element. In some examples, each of the extracted classes may be in a same color corresponding to a color of the class as represented in the pie chart for easy identification.

FIG. 10A also shows a second window listing extracted data from individual log files in the UI dashboard. As a non-limiting example, the second window may list each log file in a row and display different columns corresponding to different categories. Here, example 1000a shows the different columns as date/time, logged severity level, sentiment score, and the actual raw message of the log file. Those skilled in the art will recognize that a user may choose any other combination of categories or fields of data to display in the columns.

FIG. 10A also shows a third window listing filtering options directly in the UI dashboard. Here, users may apply filters to a current data set of log files by either clicking on selectable UI elements of slices of the pie chart, selectable UI elements of plots from the time series plot, or selectable UI elements of the results of the different categories to apply a filter.

Figure 10B:
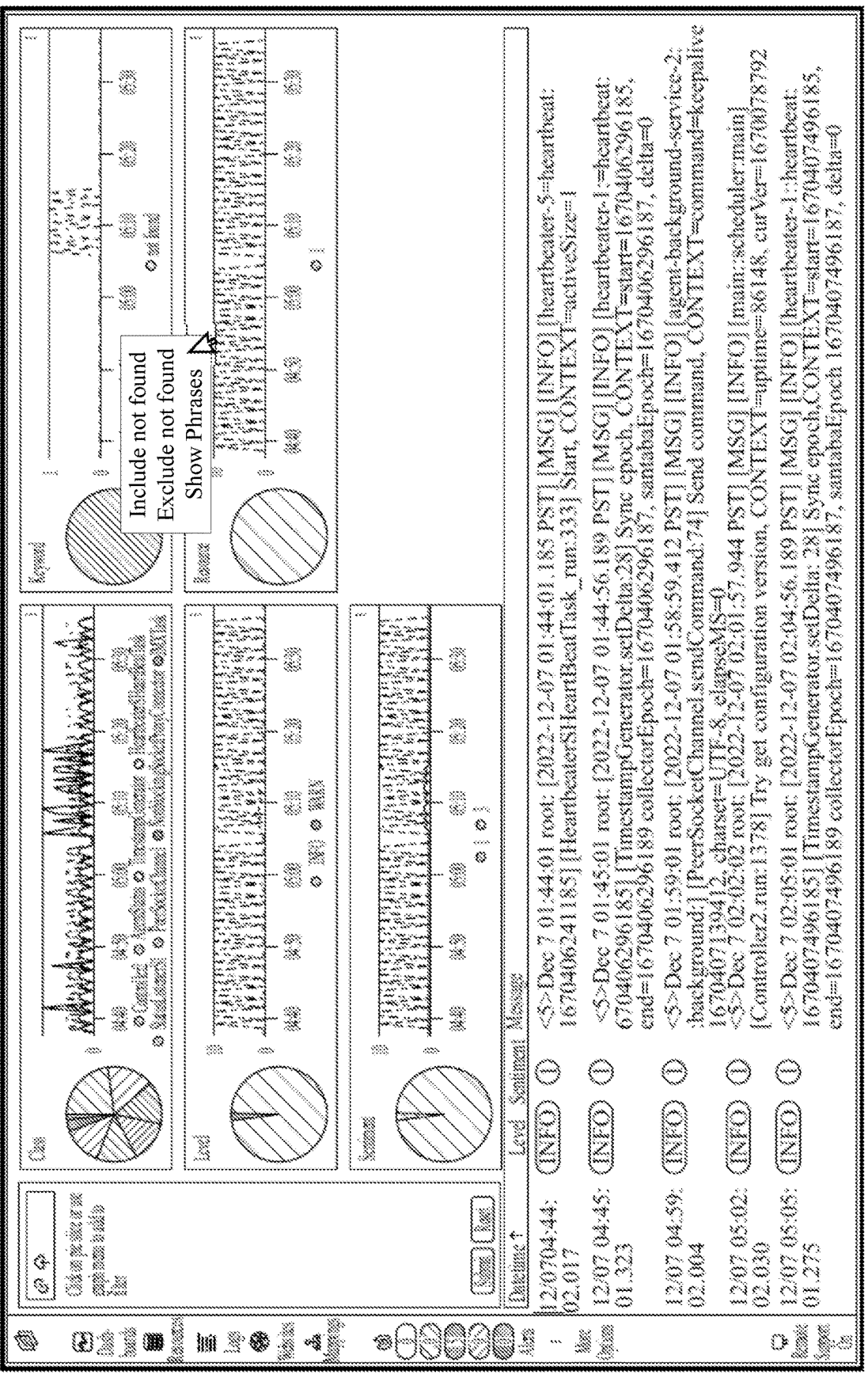

FIG. 10B shows an example 1000b of the user choosing a filter to apply directly in the UI dashboard using selectable UI elements. Here, for keyword class, the keyword pie chart only consists of the negative sentiment keyword of "not found." Upon selecting the slice of the pie chart for "not found," the user may apply a "include 'not found'" filter, a "exclude 'not found'" filter, or "show phrases" operation. As shown in example 1000B of FIG. 10B, the user clicks the section of the pie chart that corresponds to the negative sentiment keyword of "not found" in the pie chart to display different filters to apply to the selected section of the pie chart. One of ordinary art will understand that the user may choose to apply a filter to any of the selectable UI elements in the first window (e.g., controller 2, info, warn, 1, 3, etc.) and apply any number of filters within the same category or with different categories.

Figure 10C:
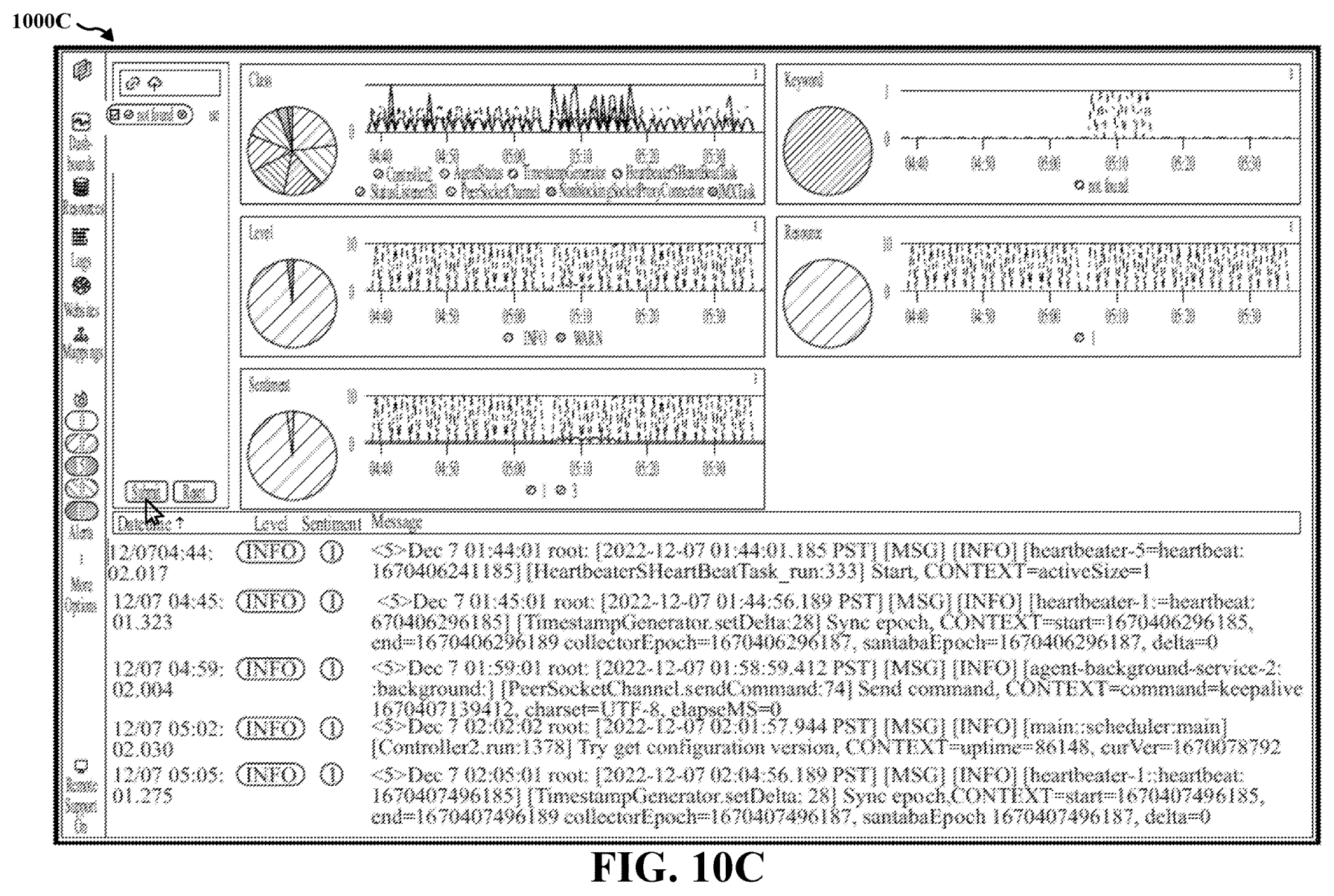

FIG. 10C shows an example 1000c of the user selecting a "include 'not found'" filter for the negative sentiment keyword "not found." As shown in example 1000C of FIG. 10C, the user applies the filter for the negative sentiment keyword "not found" by clicking a submit button in a filter window. In some examples, the user may apply more than one filter to further narrow the data logs. In addition, the user may conveniently submit and reset any filters directly on the third window of the UI interface.

Figure 10D:
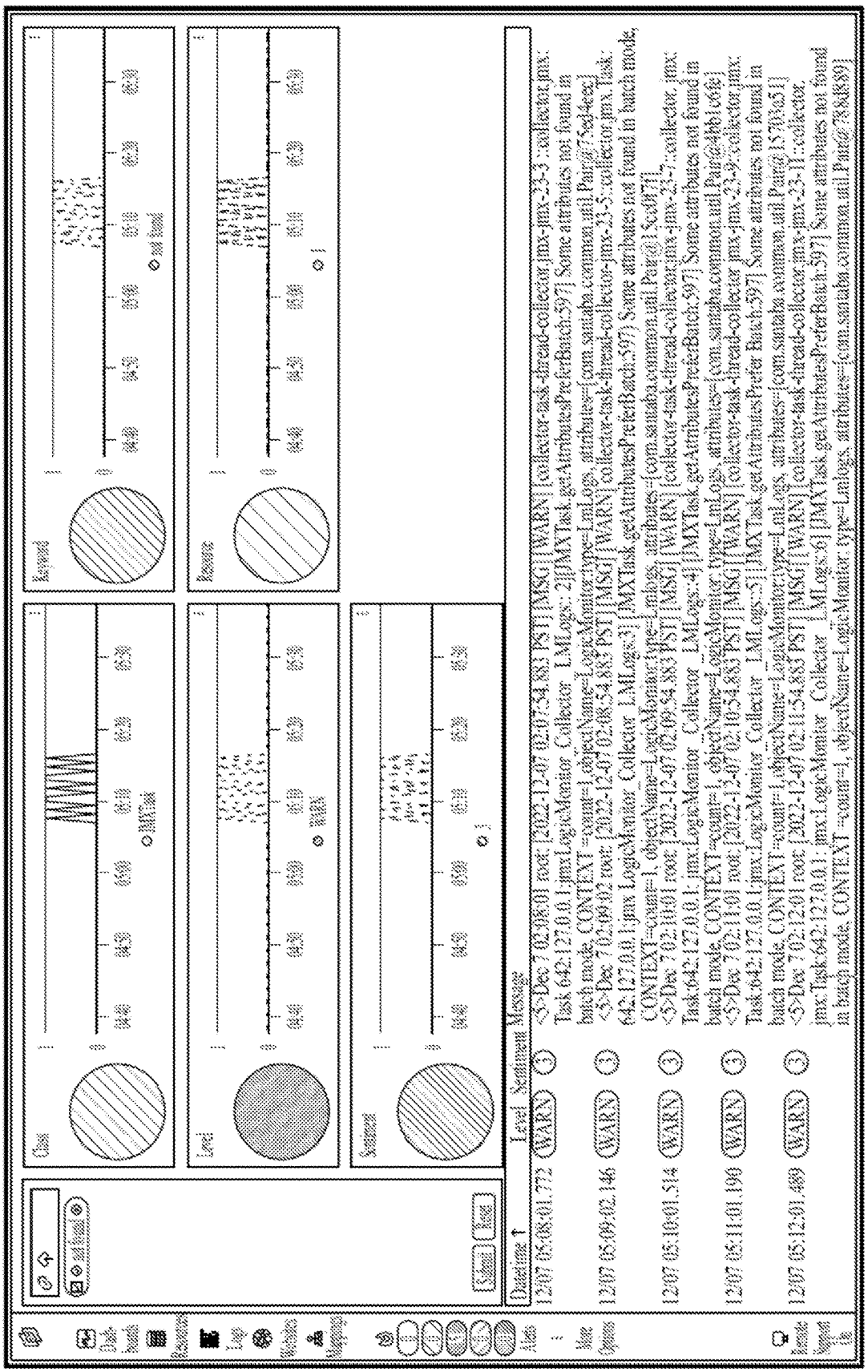

FIG. 10D shows an example 1000d of the UI interface returning results of applying the "include 'not found'" filter. As shown in example 1000D of FIG. 10D, upon clicking submit of the "include 'not found'" filter, the first window and the second window will display results of the data log files with the "include 'not found'" filter applied. As shown in the first window, the current data set for the class window, the level window, the sentiment window, and the resource window are displayed to only show data log files that include the keyword "not found." Here, it is also noted that, upon applying this filter, all the data logs now display a higher sentiment level of 3 indicating that the negative sentiment keyword "not found" has narrowed the relevant logs to investigate for the user and that the sentiment level of 3 may indicate that the relevant logs should be interest to the user. This further shows how using the UI interface may show correlations and/or causations between different categories that may not be readily apparent when using previous systems. In addition, since there is a variety of data displayed in the UI category, the user does not need to switch context and rely on manual interpretation of events and technology-specific knowledge. A user may simply click a few data results to determine that there is a correlation between the negative sentiment keyword "not found" and that the data logs containing "not found" all have a generated sentiment score of 3. As an example, if the data logs containing "not found" all have a generated sentiment score of 1, then the user may easily interpret that the negative sentiment keyword of "not found" is most likely not of interest.

As compared with writing complicated queries using an advanced search and then continuously updating the query to narrow your results, it should also be appreciated that the UI dashboard allows a user to quickly and easily filter data logs without search dialogs or using query language to find the relevant logs or requiring deep domain expertise to understand how to write the queries. In addition, since there is no querying, there is also no need to index the data logs. The UI dashboard also displays the results of the filtered data using charts and time series plots to show the relationships of log files from different categories and data within those log files to help a user see if there is any correlation or causation between data logs. This in turn results in an easier way for users to debug data log files and to find relevant log lines related to an alert (or current issue) with a few simply clicks.

FIG. 11 is a block diagram of a computing device 1100. The computing device 1100 may include software and/or hardware for providing functionality and features described herein. The computing device 1100 may therefore include one or more of: logic arrays, memories, analog circuits, digital circuits, software, firmware and processors. The hardware and firmware components of the computing device 1100 may include various specialized units, circuits, software and interfaces for providing the functionality and features described herein. For example, a system of two physical network objects may provide continual automated discovering of the topology information of macro-clusters and relationship between those macro-clusters.

The computing device 1100 has a processor 1110 coupled to a memory 1112, storage 1114, a network interface 1116 and an I/O interface 1118. The processor 1110 may be or include one or more microprocessors, field programmable gate arrays (FPGAs), application specific integrated circuits (ASICs), programmable logic devices (PLDs) and programmable logic arrays (PLAs).

The memory 1112 may be or include RAM, ROM, DRAM, SRAM and MRAM, and may include firmware, such as static data or fixed instructions, BIOS, system functions, configuration data, and other routines used during the operation of the computing device 1100 and processor 1110. The memory 1112 also provides a storage area for data and instructions associated with applications and data handled by the processor 1110. As used herein the term "memory" corresponds to the memory 1112 and explicitly excludes transitory media such as signals or waveforms.

The storage 1114 provides non-volatile, bulk or long-term storage of data or instructions in the computing device 1100. It may be internal or external storage. The storage 1114 may take the form of a magnetic or solid-state disk, tape, CD, DVD, or other reasonably high capacity addressable or serial storage medium. Multiple storage devices may be provided or available to the computing device 1100. Some of these storage devices may be external to the computing device 1100, such as network storage or cloud-based storage. As used herein, the terms "storage" and "storage medium" correspond to the storage 1114 and explicitly exclude transitory media such as signals or waveforms. In some cases, such as those involving solid-state memory devices, the memory 1112 and storage 1114 may be a single device.

The network interface 1116 includes an interface to a network such as a network that can be used to communicate calls, signals, streams, arrays, flagged samples and feedback described herein. The network interface 1116 may be wired or wireless.

The I/O interface 1118 interfaces the processor 1110 to peripherals (not shown) such as displays, video and still cameras, microphones, keyboards and USB devices.

In some cases, storage 1114 is a non-volatile machine-readable storage medium that includes all types of computer readable media, including magnetic storage media, optical storage media, and solid-state storage media. It should be understood that the software can be installed in and sold with the client computer 170. Alternatively, the software can be obtained and loaded into the client computer 170, including obtaining the software via a disc medium or from any manner of network or distribution system, including from a server owned by the software creator or from a server not owned but used by the software creator. The software can be stored on a server for distribution over the Internet.

The subject matter described herein can be implemented to realize one or more benefits or advantages. For instance, the techniques disclosed herein enable a method for performing forensic log analysis (automatic log analysis). As a result, users may easily identify issues in data logs without requiring an index, writing queries in DQL, or excessive iterations of trying different queries until a relevant log file is found. In addition, the techniques disclosed herein also gives the user an ability to understand each log line based on a sentiment score. In turn, this allows the user to user to more easily interpret the level of interest of a particular data log. Finally, the techniques disclosed herein also include a UI dashboard that allows a user to more easily visualize and understand different data log files identified by categories.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing unit may be implemented in hardware (e.g., by processing circuitry), software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

What is claimed is:

1. A method of performing forensic log analysis, comprising:
   obtaining log files from an operating system, an application, a server, or a device;
   parsing data from the log files to generate categories including at least one of exceptions, keywords, severity levels, resources, or classes, wherein each type of category has a respective category weight value;
   identifying phrases based at least in part on the categories;
   generating a sentiment score for a log line from the log files based at least in part on one of the categories, category weight values, or the phrases;
   displaying, on a display, a dashboard that includes a first window with selectable user interface (UI) elements representing results of the parsed data visually separated by the categories and a second window showing data from the log files corresponding to the results of the parsed data;
   filtering the results of the parsed data based at least in part on receiving, via an input interface, a selection of a selectable UI element among the selectable UI elements from the first window of the dashboard; and displaying, on the display, extracted data from the log files corresponding to the filtering results in the second window of the dashboard.

2. The method of claim 1, wherein the identifying phrases based at least in part on the categories comprises:
detecting negative sentiment keywords from the phrases in the log files,
wherein the sentiment score is further generated based at least in part on a weight of the negative sentiment keywords.

3. The method of claim 1, wherein the identifying phrases based at least in part on the categories comprises:
detecting a severity level logged by a user from the log files,
wherein the sentiment score is further generated based at least in part on a weight of the severity level logged by the user.

4. The method of claim 1, wherein the identifying phrases based at least in part on the categories comprises:
extracting data from data fields of the log files, wherein the data fields correspond to a severity level logged by a user, an exceptions field, a class field, and a library field,
wherein the sentiment score is further generated based at least in part on a weight of the data from the data fields.

5. The method of claim 1, wherein the log files are obtained based on executing a query search without using data query language.

6. The method of claim 1, further comprising:
generating sentiment scores for each log line from the log files based at least on using the categories, category weight values for the categories, and the phrases.

7. The method of claim 1, further comprising:
determining a log file based on the generated sentiment score.

8. The method of claim 1, further comprising:
saving the parsed data as a query search based on the sentiment score exceeding a threshold.

9. The method of claim 1, wherein the results are filtered based at least in part on an include filter, an exclude filter, or a show phrases operation.

10. The method of claim 1, wherein the second window showing data from the log files includes at least a first column for a date and time, a second column for severity level, a third column for the sentiment score, and a fourth column showing a message of the log line.

11. A system comprising:
at least one memory; and
at least one processor communicatively coupled with the at least one memory, the at least one processor operable to cause the system to:
obtain log files from an operating system, an application, a server, or a device;
parse data from the log files to generate categories including at least one of exceptions, keywords, severity levels, resources, or classes, wherein each type of category has a respective category weight value;
identify phrases based at least in part on the categories;
generate a sentiment score for a log line from the log files based at least in part on one of the categories, category weight values, or the phrases;
display, on a display, a dashboard that includes a first window with selectable user interface (UI) elements representing results of the parsed data visually separated by the categories and a second window showing data from the log files corresponding to the results of the parsed data;
filter the results of the parsed data based at least in part on receiving, via an input interface, a selection of a selectable UI element among the selectable UI elements from the first window of the dashboard; and
display, on the display, extracted data from the log files corresponding to the filtering results in the second window of the dashboard.

12. The system of claim 11, wherein the identifying phrases based at least in part on the categories comprises:
detecting negative sentiment keywords from the phrases in the log files,
wherein the sentiment score is further generated based at least in part on a weight of the negative sentiment keywords.

13. The system of claim 11, wherein the identifying phrases based at least in part on the categories comprises:
detecting a severity level logged by a user from the log files,
wherein the sentiment score is further generated based at least in part on a weight of the severity level logged by the user.

14. The system of claim 11, wherein the identifying phrases based at least in part on the categories comprises:
extracting data from data fields of the log files, wherein the data fields correspond to a severity level logged by a user, an exceptions field, a class field, and a library field,
wherein the sentiment score is further generated based at least in part on a weight of the data from the data fields.

15. The system of claim 11, wherein the log files are obtained based on executing a query search without using data query language.

16. The system of claim 11, wherein the at least one processor is operable to further cause the system to:
generate sentiment scores for each log line from the log files based at least in part on using the categories, category weight values, and the phrases.

17. The system of claim 11, wherein the second window showing data from the log files includes at least a first column for a date and time, a second column for severity level, a third column for the sentiment score, and a fourth column showing a message of the log line.

18. The system of claim 11, wherein the at least one processor is operable to further cause the system to:
determine a log file based on the generated sentiment score.

19. A computer program product embodied in a non-transitory computer-readable storage medium storing instructions, which when executed by at least one processor, causes the at least one processor to:
obtain log files from an operating system, an application, a server, or a device;
parse data from the log files to generate categories including at least one of exceptions, keywords, severity levels, resources, or classes, wherein each type of category has a respective category weight value;
identify phrases based at least in part on the categories;
generate a sentiment score for a log line from the log files based at least in part on categories, category weight values, or the phrases;
display, on a display, a dashboard that includes a first window with selectable user interface (UI) elements representing results of the parsed data visually separated by the categories and a second window showing data from the log files corresponding to the results of the parsed data;

filter the results of the parsed data based at least in part on receiving, via an input interface, a selection of a selectable UI element among the selectable UI elements from the first window of the dashboard; and display, on the display, extracted data from the log files corresponding to the filtering results in the second window of the dashboard.

\* \* \* \* \*